United States Patent
Le Garrec et al.

(10) Patent No.: US 9,932,115 B2
(45) Date of Patent: Apr. 3, 2018

(54) AIRCRAFT WING ELEMENT

(71) Applicant: Zodiac Aerotechnics, Plaisir (FR)

(72) Inventors: Stéphane Le Garrec, Argenteuil (FR); Philippe Portier, Le Perray en Yvelines (FR); Martial Buron, Beynes (FR); Adao Delehelle, Gazeran (FR); Bruno Thillays, Beynes (FR)

(73) Assignee: Zodiac Aerotechnics, Plaisir (FR)

( * ) Notice: Subject to any disclaimer, the term of this patent is extended or adjusted under 35 U.S.C. 154(b) by 303 days.

(21) Appl. No.: 14/953,816

(22) Filed: Nov. 30, 2015

(65) Prior Publication Data

US 2016/0159485 A1   Jun. 9, 2016

(30) Foreign Application Priority Data

Dec. 8, 2014 (EP) .................................. 14306966.4

(51) Int. Cl.
*B64D 15/12* (2006.01)

(52) U.S. Cl.
CPC .................................. *B64D 15/12* (2013.01)

(58) Field of Classification Search
CPC .................................................. B64D 15/12
USPC .............................. 244/134 D, 134 B, 134 C
See application file for complete search history.

(56) References Cited

U.S. PATENT DOCUMENTS

| | | | |
|---|---|---|---|
| 2,599,059 A * | 6/1952 | Jones .................. | B64D 15/166 244/134 D |
| 6,283,411 B1 | 9/2001 | Giamati et al. | |
| 7,523,889 B2 | 4/2009 | Bourjac et al. | |
| 8,517,601 B2 | 8/2013 | Stothers et al. | |
| 8,602,359 B2 | 12/2013 | Stothers | |
| 8,807,483 B2 | 8/2014 | Lewis et al. | |
| 9,038,363 B2 | 5/2015 | Pereira et al. | |
| 2010/0000066 A1 * | 1/2010 | Boissy .................. | B64D 15/12 29/428 |
| 2011/0277443 A1 | 11/2011 | Pereira et al. | |
| 2013/0001211 A1 | 1/2013 | Lewis et al. | |
| 2015/0346122 A1 * | 12/2015 | Stothers ................. | B64D 15/14 702/130 |

FOREIGN PATENT DOCUMENTS

| | | |
|---|---|---|
| CN | 103837569 A | 6/2014 |
| DE | 102004042423 A1 | 3/2006 |
| DE | 102008051553 A1 | 4/2010 |
| EP | 0749894 A2 | 12/1996 |
| EP | 1204551 B1 | 7/2006 |
| EP | 2281748 A1 | 2/2011 |
| EP | 2382129 B1 | 11/2011 |

(Continued)

OTHER PUBLICATIONS

European Patent Application No. EP14306966.4, Search Report dated May 18, 2015, 4 pages.

*Primary Examiner* — Christopher P Ellis
*Assistant Examiner* — Magdalena Topolski
(74) *Attorney, Agent, or Firm* — Kilpatrick Townsend & Stockton LLP; Dean W. Russell

(57) ABSTRACT

An aircraft wing element comprises two temperature sensors that are situated on each side of an electrothermal mat, between a structure portion and a shield of said wing element. A shield temperature can be measured more accurately, and a thermal energy flow that is transferred to the shield can be evaluated.

8 Claims, 1 Drawing Sheet

(56) References Cited

FOREIGN PATENT DOCUMENTS

| | | | |
|---|---|---|---|
| FR | 2863586 | A1 | 6/2005 |
| FR | 2986777 | A1 | 8/2013 |
| FR | 2993241 | A1 | 1/2014 |
| GB | 1117843 | | 6/1968 |
| GB | 2477339 | A | 8/2011 |
| GB | 2505994 | A | 3/2014 |
| WO | 2007135383 | A1 | 11/2007 |
| WO | 2011015291 | A2 | 2/2011 |
| WO | 2011092482 | A1 | 8/2011 |
| WO | 2013034083 | A1 | 3/2013 |

* cited by examiner

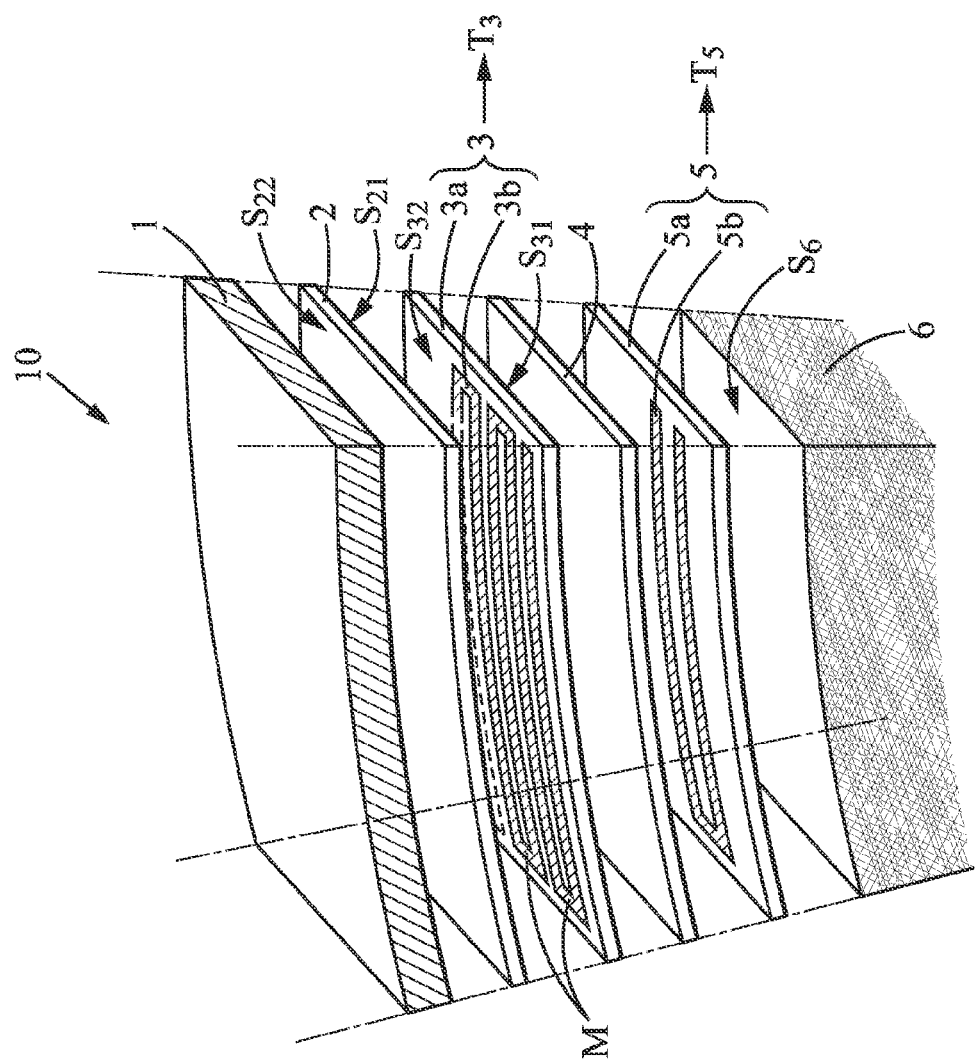
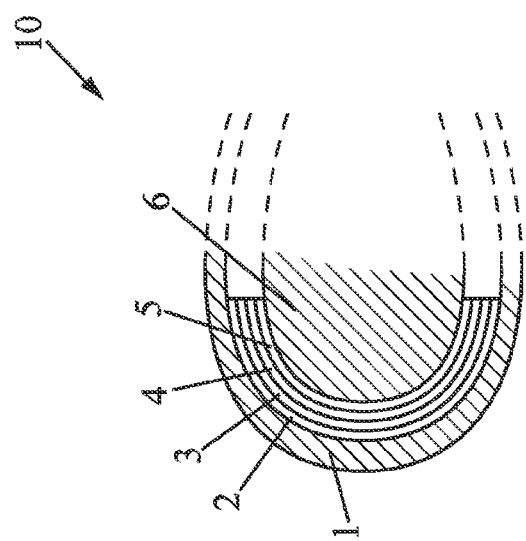

AIRCRAFT WING ELEMENT

TECHNICAL FIELD

The present invention relates to an aircraft wing element and a method for protection of such wing element against ice. By protection against ice is meant both preventive action against the formation of ice on the wing element and action intended to remove ice that has already formed on this wing element.

Under certain atmospheric conditions, parts of the wing of an aircraft in flight may be subject to formation and accumulation of ice. This is the case in particular for the leading edges of aircraft wings or helicopter blades. The accumulation of ice can make the aircraft significantly heavier and change the lift capacity of the wing. For these reasons, some wing elements are equipped with anti-icing systems that are capable of preventing the formation of ice, or de-icing systems that are capable of melting ice that has accumulated on these elements. Such systems may optionally have both anti-icing and de-icing functions.

BACKGROUND OF THE INVENTION

Thus in a manner known for example from the document WO 2007/135383, an aircraft wing element comprising a rigid internal structure portion and a shield which is intended to be exposed to atmosphere during an aircraft flight, can also comprise several components superimposed between this structure portion and this shield. Each of these components is in the form of a layer which is arranged parallel to a surface of the structure portion. These components comprise at least the following three, in the order in which they are listed, starting from the structure portion:
- a first temperature sensor, which itself comprises a first support film and at least one first track of a first electrically conductive material with an electrical resistivity value of this first material that varies as a function of its temperature, the first sensor being rigidly connected to the surface of the structure portion;
- an electrothermal mat forming a heating element, which is rigidly connected to the first sensor; and
- an electrically insulating film, which is rigidly connected to the electrothermal mat by a first face of this insulating film, and connected to the shield by a second face of the same insulating film, and which is capable of transferring heat between these first and second faces of the insulating film.

When it is supplied with electrical current, the electrothermal mat produces heat, at least part of which diffuses towards the shield with the aim of preventing ice formation or melting any ice which has already accumulated thereon.

The function of the insulating film is to electrically insulate the shield with respect to internal components of the wing element, in particular with respect to the electrothermal mat. It also protects some of these components against electrical discharges which may occur on the shield, in particular lightning strikes.

Finally, the function of the first temperature sensor is to measure the temperature of the electrothermal mat, for example with the aim of regulating this temperature.

However, such wing element does not make it possible to know the temperature of the shield separately from that of the electrothermal mat, or to evaluate the flow of thermal energy that is transferred to the shield when the electrothermal mat is supplied with electrical current.

An object of the present invention is thus to improve such wing element in order to make it possible to measure the temperature of the shield separately from that of the electrothermal mat, and to evaluate the flow of thermal energy that is transferred to the shield.

An additional object is to avoid the modifications introduced by the invention to a wing element causing heat accumulation points between the shield and the electrothermal mat during operation of this latter. In fact, such localized accumulations of heat are likely to degrade the wing element, in particular by affecting or deforming some of its components.

BRIEF SUMMARY OF THE INVENTION

In order to achieve these objects or others, a first aspect of the present invention proposes a wing element as described above, but which also comprises between the electrothermal mat and the insulating film:
- a second temperature sensor, which itself comprises a second support film and at least a second track of a second electrically conductive material, with an electrical resistivity value of the second material which varies as a function of a temperature of the latter, the second temperature sensor being rigidly connected to the electrothermal mat by a first face of this second sensor, and to the insulating film by a second face of this same second sensor.

Due to the position of the second sensor in the stack of components within the wing element, the temperature that is measured by this second sensor is closer to the actual temperature of the shield, in comparison with the temperature that is measured by the first sensor.

Furthermore, as the second temperature sensor is placed in the flow of thermal energy which is produced towards the shield when the electrothermal mat is in operation, it is possible to obtain an evaluation of this thermal energy flow based on the difference between the two temperatures that are measured using the first and the second sensor respectively.

According to an additional feature of the invention, for the second temperature sensor, the second track forms meanders on the second support film, and an average rate of surface occupation of the second track on the second support film, when it is evaluated in an area that contains several adjacent meanders, is at least equal to 50%.

In this way, large-scale inhomogeneities in the thermal conductivity of the second temperature sensor are reduced. The second track then participates in the transfer to the shield of the heat that is produced by the electrothermal mat during operation of the latter, in a manner that is substantially uniform over the entire surface of the structure portion. The occurrence of heat accumulation points is thus avoided.

In different embodiments of the invention, the wing element can equip any fixed, mobile and/or rotary wing, and in particular form a leading edge segment of an aeroplane wing or helicopter blade.

Moreover, in the second temperature sensor, the second track may be situated on the face of the second support film that is turned towards the shield. Thus the temperature that is measured using this second sensor is even more representative of the actual temperature of the shield.

Also in the second temperature sensor, the thickness of the second support film may be comprised between 25 µm (micrometer) and 250 µm, when it is measured perpendicularly to the surface of the structure portion. Such a thickness contributes to a compromise between sufficient mechanical strength of this sensor, a measured temperature that is closer to the actual temperature of the shield, and avoids creating too great a thermal resistance between the electrothermal mat and the shield.

Also advantageously, this second support film may be based on polyimide, in particular based on polymer material known as Kapton® and marketed by DuPont de Nemours.

Still advantageously, the average rate of surface occupation of the second track on the second support film, when it is evaluated in the area which contains several adjacent meanders of the second track, may be at least equal to 65%, preferably at least equal to 75%.

Finally, the surface of the structure portion may be constituted by a material that is thermally insulating, in particular a material based on epoxy resin. The heat produced by the electrothermal mat is then transferred into a larger proportion to the shield. Simultaneously, the temperature that is measured using the first sensor is even more representative of the actual temperature of the electrothermal mat.

A second aspect of the invention proposes a method for protection of an aircraft wing element against ice, when this wing element is according to the first aspect of the invention, the method comprising:
supplying electricity to the electrothermal mat so as to heat the wing element;
measuring two temperatures by using the first temperature sensor for one of these temperatures and the second temperature sensor for the other one of these temperatures; and
based on the two measured temperatures, evaluating a thermal energy flow that is delivered to the shield.

Other characteristics and advantages of the present invention will become apparent in the description below of non-limitative embodiments, with reference to the attached drawings, in which:

BRIEF DESCRIPTION OF THE DRAWINGS

FIG. 1 is a cross section view of a wing element according to the present invention; and
FIG. 2 is an exploded perspective view of the wing element in FIG. 1.

For clarity sake, the dimensions of the different elements represented in these figures do not correspond either to actual dimensions or to dimensional relationships. Moreover, identical references that are indicated in both figures denote identical elements, or those with identical functions.

DETAILED DESCRIPTION OF EMBODIMENTS OF THE INVENTION

The references used have the following meanings:
10 aircraft wing element overall
1 shield
2 electrically insulating film
$S_{21}$, $S_{22}$ two opposite faces of the film 2
3 temperature sensor, called external sensor
3a support film of the sensor 3
3b track of the sensor 3
M meanders of the track 3b on the support film 3a
$S_{31}$, $S_{32}$ two opposite faces of the sensor 3
4 electrothermal mat
5 other temperature sensor, called internal sensor
5a support film of the sensor 5
5b track of the sensor 5
6 rigid internal structure of the wing element
$S_6$ surface of the structure 6
$T_3$, $T_5$ temperatures measured respectively by the sensors 3 and 5

The shield 1 is intended to be exposed to atmosphere during a flight of the aircraft and provides the wing element 10 with its external shape, for example a leading edge shape. The shield 1 may be of aluminium or titanium, for example.

The structure 6 provides mechanical support to the wing element 10. It may have different compositions, in particular depending on whether the wing element 10 is part of a fixed or mobile wing, such as a leading edge of an aeroplane wing, or part of a rotating wing, such as a helicopter blade or a blade segment. Preferably, the surface $S_6$ of the structure 6 is constituted by a thermally insulating material, such as epoxy resin for example. The surface $S_6$ may have any shape whatever, in particular cylindrical or double-curved.

The internal sensor 5, the electrothermal mat 4, the external sensor 3, the insulating film 2 and the shield 1 form a stack on the surface $S_6$ of the structure 6, which conforms to the curvature that may have this surface $S_6$. Such a shaping of the stack is facilitated by the layered structure and the flexibility of each component of the stack. All these different components may then be held firmly together by intermediate connecting layers, not shown, such as layers of adhesive material or fusible resin.

The insulating film 2 may be of Kapton®, and has a thickness that is suitable for electrically insulating the shield 1 from the components further inside the stack, in particular in order to insulate the electrothermal mat 4. This thickness may be of the order of 100 µm, for example. Generally, the thickness of the part of the stack that is situated above the electrothermal mat 4, in the direction of the shield 1, is advantageously reduced in order to improve the efficiency and speed of heating the shield 1 when the electrothermal mat 4 is in operation. The film 2 may be connected to the external temperature sensor 3 by its face $S_{21}$ and to the shield 1 by its face $S_{22}$.

The electrothermal mat 4 may be of a commercially available type, in particular for the function of de-icing aircraft wing elements. For example, this may be a fabric or a mesh of fibres, onto which a metal has been vapour-deposited. The injection of an electrical current into such a mat produces a heat flow by Joule effect. Due to the thermally insulting nature of the surface $S_6$ of the structure 6, a main part of this heat flow is oriented towards the shield 1, through the external sensor 3, the insulating film 2 and the intermediate connecting layers, in order to produce a preventive heating of the shield 1 against the formation of ice, or heating for de-icing. The thickness of the electrothermal mat 4 may be comprised between 100 µm and 1 mm (millimeter), for example.

The two temperature sensors 3 and 5 may be constituted in a similar way, although this is not necessary.

The internal sensor 5, which was denoted first temperature sensor in the general part of the present description, is situated between the electrothermal mat 4 and the structure 6. It is constituted by the continuous track 5b of an electrically conductive material, which was formed, transferred, printed or deposited by electrolysis on the support film 5a. The material of the track 5b is selected in order to present an electrical resistivity value that varies as a function of the temperature. This material may be copper, or one of the alloys known as Constantan® or Chromel®. For example, for copper, the variation in electrical resistivity as a function of temperature is approximately 0.393%/° C. in relative value. Typically, the track 5b may be dimensioned to present an electrical resistance that is comprised between 100 ohms and 1000 ohms. By using a measurement principle that is known from other sources, the electrical voltage that is measured between two ends of the track 5b when an electrical current is injected into this track is representative of the value of the temperature at the location of the sensor 5. The support film 5a may also be of Kapton® with a thickness of 100 μm, for example. Preferably, the sensor 5 may be oriented in the stack so that the track 5b is situated on the face of the support film 5a that is turned towards the electrothermal mat 4. Thus, the temperature $T_5$ that is measured using the sensor 5 is more representative of the actual temperature of the mat 4.

The external sensor 3, which was denoted second temperature sensor in the general part of the present description, is more particularly the subject of the present invention. It is situated between the electrothermal mat 4 and the insulating film 2, linked to the mat 4 by its face $S_{31}$ and to the film 2 by its face $S_{32}$. It is constituted by the continuous track 3b of an electrically conductive material, which has been formed, transferred, printed or deposited by electrolysis on the support film 3a. The materials of the support film 3a and of the track 3b may be, but are not necessarily, similar to those of the sensor 5. However, the temperature measurement principle using the sensor 3 is identical to that of the sensor 5. The track 3b may thus be dimensioned in order to present an electrical resistance that is comprised between 100 ohms and 1000 ohms. Preferably, the sensor 3 may be oriented in the stack so that its track 3b is situated on the face $S_{32}$ of the sensor 3 that is turned towards the insulating film 2. Thus, the temperature $T_3$ that is measured using the sensor 3 is more representative of the actual temperature of the shield 1.

Due to the position of the sensor 3 in the stack between the electrothermal mat 4 and the shield 1, the following two considerations avoid the sensor 3 significantly disturbing the de-icing of the shield 1, and the operation of the electrothermal mat 4 causing damage to the wing element 10.

Firstly, the sensor 3 advantageously has a low thermal resistance between its two faces $S_{31}$ and $S_{32}$. Thus this results in a limited delay in diffusion of the heat produced by the electrothermal mat 4 towards the shield 1. At the same time, the sensor 3 preferably has a mechanical strength that is sufficient to facilitate its assembly in the stack. To this end, the support film 3a may have a thickness comprised between 25 μm and 250 μm, for example equal to 100 μm. Moreover, the support film 3a may advantageously be of Kapton®.

Further, the value for the thermal resistance of the sensor 3, with respect to the heat flow produced by the electrothermal mat 4 towards the shield 1, preferably has variations that are limited for displacements parallel to the surface $S_6$. In fact, a value that is locally greater for this thermal resistance could cause overheating at this location during the operation of the electrothermal mat 4 which is likely to degrade the wing element 10. Now, the local value for the thermal resistance of the sensor 3 depends in particular on the presence or absence of a segment of the track 3b at this location. According to the invention, the track 3b must cover on average at least 50% of the surface of the support film 3a in order to limit such inhomogeneities in the thermal resistance. Combining this feature with the range of values for the electrical resistance of the track 3b results in the production of this track 3b in the form of loops, i.e. meanders M, on the support film 3a. These meanders can however have any shapes and patterns whatever.

Based on these considerations, a person skilled in the art knows how to choose suitable values for dimensioning the track 3b. For example, when it is of copper with a thickness of 100 μm and has a width of 0.5 mm (millimeter), the track 3b may have a total length of 500 m (meter) measured following all of the meanders M. The spacing between two adjacent segments of the track 3b in the meanders M can then be approximately 0.1 mm, which ensures that the thermal conductivity through the sensor 3 occurs in a substantially uniform manner with respect to the shield 1.

A method for the use of the wing element 10 will now be described.

Upon continuous supply of electrical current to the electrothermal mat 4, the two temperatures $T_3$ et $T_5$ can be measured separately and simultaneously, by means of two separate sensors 3 et 5 provided by the invention. Then the flow of thermal energy that diffuses from the electromagnetic mat 4 towards the shield 1 can be estimated by applying Fick's law: $dP=(T_5-T_3)/R_{th}$, where dP denotes the thermal energy flow, i.e. the power density that is diffused, for example expressed in $W/cm^2$ (watts per square centimeter), and $R_{th}$ is the thermal resistance between the mat 4 and the external sensor 3 per unit of surface extending parallel to the surface $S_6$.

Optionally, the electrothermal mat 4 can be supplied intermittently, with peaks of electrical current separated by periods of thermal relaxation. Thus, analysis of the rate of change of temperature $T_3$ which is measured by the external sensor 3 during the periods of relaxation, can provide an indication of the presence or absence of ice on the shield 1, and optionally also an indication of the thickness of the ice layer. Indeed, the release to the atmosphere of the thermal energy that is supplied during each interval of electrical current injection is modified by the presence of ice, if any, on the shield 1. Such a detection of the presence of ice, and possibly also evaluation of the thickness of the layer of ice, are made more reliable and more accurate thanks to the use of the external sensor 3 introduced by the present invention, in addition to the internal sensor 5.

Of course, the invention can be reproduced by modifying certain secondary aspects that have been mentioned in the detailed description above. In particular, the numerical values and the materials listed are given merely by way of example.

The invention claimed is:

1. An aircraft wing element comprising a rigid internal structure portion and a shield intended to be exposed to atmosphere during a flight of the aircraft, and also comprising at least three components which are superimposed between a surface of the structure portion and the shield in an order of listing of said three components, starting from the structure portion, each component being in a form of a layer arranged parallel to the surface of the structure portion:
   a first temperature sensor, comprising a first support film and at least one first track of a first electrically conductive material with an electrical resistivity value of the first material that varies as a function of a temperature of said first material, said first sensor being rigidly connected to the surface of the structure portion;
   an electrothermal mat forming a heating element, rigidly connected to the first sensor; and
   an electrically insulating film, rigidly connected to the electrothermal mat by a first face of said insulating film, and connected to the shield by a second face of said insulating film, and capable of transferring heat between said first and second faces of said insulating film,
wherein the wing element also comprises between the electrothermal mat and the insulating film:

a second temperature sensor, comprising a second support film and at least a second track of a second electrically conductive material, with an electrical resistivity value of the second material which varies as a function of a temperature of said second material, said second temperature sensor being rigidly connected to the electrothermal mat by a first face of said second sensor, and to the insulating film by a second face of said second sensor, and the second track forms meanders on the second support film, and an average rate of surface occupation of the second track on the second support film is at least equal to 50% when evaluated in an area which contains several adjacent meanders of the second track.

2. The aircraft wing element according to claim 1, forming a leading edge segment of an aeroplane wing or a helicopter blade.

3. The aircraft wing element of claim 1, wherein, in the second temperature sensor, the second track is situated on a face of the second support film turned towards the shield.

4. The aircraft wing element of claim 1, wherein, in the second temperature sensor, a thickness of the second support film is between 25 µm and 250 µm, measured perpendicularly to the surface of the structure portion.

5. The aircraft wing element of claim 1, wherein, in the second temperature sensor, the second support film comprises polyimide.

6. The aircraft wing element of claim 1, wherein, for the second temperature sensor, the average surface occupation rate of the second track on the second support film, evaluated in the area that contains several adjacent meanders of the second track, is at least equal to 65%, preferably at least equal to 75%.

7. The aircraft wing element of claim 1, wherein the surface of the structure portion is a thermally insulating material, comprising epoxy resin.

8. Method for protecting an aircraft wing element against ice, said aircraft wing element comprising a rigid internal structure portion and a shield intended to be exposed to atmosphere during a flight of the aircraft, and also comprising at least four components which are superimposed between a surface of the structure portion and the shield in an order of listing of said four components, starting from the structure portion, each component being in a form of a layer arranged parallel to the surface of the structure portion:

a first temperature sensor, comprising a first support film and at least one first track of a first electrically conductive material with an electrical resistivity value of the first material that varies as a function of a temperature of said first material, said first sensor being rigidly connected to the surface of the structure portion;

an electrothermal mat forming a heating element, rigidly connected to the first sensor;

a second temperature sensor, comprising a second support film and at least a second track of a second electrically conductive material, with an electrical resistivity value of the second material which varies as a function of a temperature of said second material, the second track forming meanders on the second support film, and an average rate of surface occupation of the second track on the second support film being at least equal to 50% when evaluated in an area which contains several adjacent meanders of the second track; and an electrically insulating film, rigidly connected to the electrothermal mat by a first face of said insulating film, and connected to the shield by a second face of said insulating film, and capable of transferring heat between said first and second faces of said insulating film, said second temperature sensor being rigidly connected to the electrothermal mat by a first face of said second sensor, and to the insulating film by a second face of said second sensor, the method comprising:

supplying electricity to the electrothermal mat so as to heat the wing element;

measuring two temperatures by using the first temperature sensor for one of said temperatures and the second temperature sensor for the other one of said temperatures; and based on the two measured temperatures, evaluating a thermal energy flow that is delivered to the shield.

* * * * *